United States Patent
Venkataraman et al.

(10) Patent No.: US 12,079,226 B2
(45) Date of Patent: Sep. 3, 2024

(54) APPROXIMATE TEMPLATE MATCHING FOR NATURAL LANGUAGE QUERIES

(71) Applicant: Rovi Guides, Inc., San Jose, CA (US)

(72) Inventors: Sashikumar Venkataraman, Andover, MA (US); Manik Malhotra, New Delhi (IN); Ahmed Nizam Mohaideen P, Kovilpatti (IN)

(73) Assignee: Rovi Guides, Inc., San Jose, CA (US)

( * ) Notice: Subject to any disclaimer, the term of this patent is extended or adjusted under 35 U.S.C. 154(b) by 294 days.

(21) Appl. No.: 17/521,513

(22) Filed: Nov. 8, 2021

(65) Prior Publication Data
US 2022/0138211 A1     May 5, 2022

Related U.S. Application Data

(63) Continuation of application No. 16/400,556, filed on May 1, 2019, now Pat. No. 11,200,243, which is a
(Continued)

(51) Int. Cl.
*G06F 16/245*     (2019.01)
*G06F 16/2457*    (2019.01)
(Continued)

(52) U.S. Cl.
CPC ...... *G06F 16/24578* (2019.01); *G06F 16/248* (2019.01); *G06F 16/3329* (2019.01);
(Continued)

(58) Field of Classification Search
CPC ........... G06F 16/24578; G06F 16/3329; G06F 16/248; G06F 40/186; G06F 40/106; H04N 21/42203; H04N 21/4828; H04N 21/8405
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| (Continued) | | | |

FOREIGN PATENT DOCUMENTS

| | | | |
|---|---|---|---|
| CN | 103064838 A | 4/2013 | |
| CN | 104854654 A | 8/2015 | |
| (Continued) | | | |

OTHER PUBLICATIONS

International Search Report and Written Opinion of PCT/US2017/038245 dated Sep. 20, 2017.

*Primary Examiner* — Truong V Vo
(74) *Attorney, Agent, or Firm* — Haley Guiliano LLP

(57) ABSTRACT

Systems and methods provide a media guidance application that recognizes a plurality of natural language search queries for identifying a set of search results. For example, a user may want to determine when the Yankees are playing their next baseball game. The user may structure their query in multiple ways, such as, "When are the Yankees playing?" "What time is the Yankees game?" "When is the next Yankees baseball game?" The user would expect the same result, a description of when the Yankees are playing, regardless of how the query is structured. The systems and methods enable a user to use a plurality of search queries when searching for items or information to get desired results.

20 Claims, 8 Drawing Sheets

Related U.S. Application Data continuation of application No. 16/020,618, filed on Jun. 27, 2018, now Pat. No. 10,324,940, which is a continuation of application No. 15/187,029, filed on Jun. 20, 2016, now Pat. No. 10,037,360.

(51) Int. Cl.

| | | |
|---|---|---|
| *G06F 16/248* | (2019.01) | |
| *G06F 16/332* | (2019.01) | |
| *G06F 40/106* | (2020.01) | |
| *G06F 40/186* | (2020.01) | |
| *G10L 15/26* | (2006.01) | |
| *H04N 21/422* | (2011.01) | |
| *H04N 21/482* | (2011.01) | |
| *H04N 21/8405* | (2011.01) | |

(52) U.S. Cl.
CPC .......... *G06F 40/106* (2020.01); *G06F 40/186* (2020.01); *G10L 15/26* (2013.01); *H04N 21/42203* (2013.01); *H04N 21/4828* (2013.01); *H04N 21/8405* (2013.01)

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 8,346,792 B1 | 1/2013 | Baker et al. |
| 2002/0174430 A1 | 11/2002 | Ellis et al. |
| 2003/0069880 A1 | 4/2003 | Harrison et al. |
| 2004/0078190 A1 | 4/2004 | Fass et al. |
| 2005/0251827 A1 | 11/2005 | Ellis et al. |
| 2008/0154594 A1 | 6/2008 | Itoh et al. |
| 2010/0153885 A1 | 6/2010 | Yates |
| 2013/0262107 A1 | 10/2013 | Bernard |
| 2014/0358889 A1 | 12/2014 | Shmiel et al. |
| 2015/0039292 A1 | 2/2015 | Suleman et al. |
| 2017/0286914 A1* | 10/2017 | Fang ............... G06N 20/00 |

FOREIGN PATENT DOCUMENTS

| | | |
|---|---|---|
| CN | 105359144 A | 2/2016 |
| JP | 2007316803 A | 12/2007 |
| JP | 2008310819 A | 12/2008 |
| JP | 2016091374 A | 5/2016 |
| WO | 2016053847 A1 | 4/2016 |

* cited by examiner

| Entry # | Search Intent | Database to Search | Search Query Template | Associated Words | Representation Vector |
|---|---|---|---|---|---|
| 1 | Media Location Search | Media Guidance Data Database | Locate (Media) | Locate | $V_1$ |
| | | | | Source | $V_2$ |
| | | | | Media | $V_3$ |
| 2 | POI Location Search | POI Locacation Database | Locate (POI) | Locate | $V_1$ |
| | | | | Address | $V_4$ |
| | | | | POI | $V_5$ |

FIG. 3

APPROXIMATE TEMPLATE MATCHING FOR NATURAL LANGUAGE QUERIES

CROSS-REFERENCE TO RELATED APPLICATIONS

This application is a continuation of U.S. patent application Ser. No. 16/400,556, filed May 1, 2019, which is a continuation of U.S. patent application Ser. No. 16/020,618, filed Jun. 27, 2018, now U.S. Pat. No. 10,324,940, which is a continuation of U.S. patent application Ser. No. 15/187,029, filed Jun. 20, 2016, now U.S. Pat. No. 10,037,360, issued Jul. 31, 2018. The disclosures of which are hereby incorporated by reference herein in their entireties.

BACKGROUND

In conventional systems, users have access to a wide variety of media and information such as television programs and sports scores. Often, a user may wish to search for information using a hands-free interface, such as using voice control. Conventional systems may allow a user to perform a search using a voice command. However, these systems typically only recognize a fixed number of search queries because input voice searches are matched directly to the fixed queries themselves. Therefore, a user must structure their voice command in a particular manner so that it can be recognized by the system. Often, this requires that the user speaks in a manner which they do not find natural. In many cases, the user must look up or learn how commands need to be structured before they can use the system. If a voice command is not structured such that it can be recognized by the system, the user may be prompted to repeat the command in a manner recognized by the system and/or may be presented with no search results.

SUMMARY

Accordingly, methods and systems are described herein for a media guidance system that recognizes a plurality of natural language queries as having a similar intent and provides search results matching the intent. A user may wish to structure a query, such as a query for a game schedule, using a variety of different language. For example, a user may want to determine when the Yankees are playing their next baseball game. A user may structure their query as, "When are the Yankees playing?" or "What time is the Yankees game?" "When is the next Yankees baseball game?" The media guidance application may determine that for each of the three exemplary queries described above, the user is trying to determine when the Yankees are playing their next game.

Accordingly, the media guidance application may query a database for the next Yankees game and may present to the user results of the query. For example, the media guidance application may process words from the search query and map the word to a vector space where words having similar meanings are mapped closer together than words that do not have similar meanings. For example, the words "cat" and "dog" may be mapped closer together because the words both typically appear in text describing household pets. The media guidance application may retrieve a template from the vector space that is in close proximity to the search query and may retrieve search results based on the template. For example, the media guidance application may identify a template associated with locating one's pet in close proximity to the words "cat" and "dog" because the words and the template both relate to household pets. For example, because the media guidance application matches words of a search query to words of a generalized search query template (e.g., by matching the search query words to words of the template in a vector space), the media guidance application is able to match the search query template to variations of the search query template itself without the need to store the variations of the template in memory. Therefore, the user is not burdened with remembering and reciting structured queries as in prior art systems.

In some aspects, a media guidance application may receive an input query comprising at least two words via a user input device. For example, the media guidance application may receive textual input via a keyboard connected to the media guidance application. In some embodiments, the media guidance application may detect an audio signal, such as a voice input, at an audio input device, such as a microphone accessible to the media guidance application. The media guidance application may process the audio input to create a text string of the words in the audio signal. For example, the media guidance application may perform a speech-to-text recognition algorithm on the voice input. The media guidance application may determine, for example, after performing the speech-to-text processing on the input audio, that the input audio includes two words.

The media guidance application computes a first representation vector corresponding to a first word of the input query and a second representation vector corresponding to a second word of the input query. For example, the media guidance application may use an algorithm, such as a word-to-vector algorithm in a natural language processing toolkit accessible to the media guidance application, to generate a vector representation for each word in the input query. The media guidance application may compute the vector representation for each of the first and second words such that respective values in the first vector representation and in the second vector representation correspond to degrees to which the first word and the second word match features of a set of word features. For example, the media guidance application may determine, based on the first word, a probability of the first word co-occurring with other words from a set of words. Each respective value in the first representation vector may comprise a respective probability that the first word co-occurs with each respective word in the set. As an example, the media guidance application may receive the input query "Where's Entourage." The media guidance application may compute a first representation vector for the word "Where's" and may compute a second representation vector for the word "Entourage."

The media guidance application retrieves a search query template relating to a search intent from a database. For example, the media guidance application may query a remote server for words associated with a search intent, such as an intent to determine where a user can access media. The words may correspond to a search query template matching the intent, such as the search query "Locate media_X?" where the term "media_X" can be replaced by the media guidance application with a word corresponding to the media that the user is searching for. For example, the media guidance application may determine that the user is searching for the movie "Hunger Games." In response to determining that the user is searching for the movie "Hunger Games," the media guidance application may generate a query to a database replacing the term "media_X" in the template with the term "Hunger Games."

The media guidance application may compute a representation vector, as described above, for each of the words in the search query template. For example, the media guidance application may compute a third representation vector corresponding to a third word, such as "Locate," and may compute a fourth representation vector corresponding to a fourth word, such as "media_X." As described above, values in the third and the fourth representation vectors may represent how closely the third word and the fourth word match features of a set of word features, such as a probability of each of the third and fourth word co-occurring with each word in a set of commonly used words.

The media guidance application computes a first distance between the first representation vector and the third representation vector. The media guidance application may compute the distance to create a metric for comparing how similar the first representation vector is to the third representation vector. For example, the media guidance application may compare each value in the first representation vector with a respective value in the third representation vector to compute the distance. For example, the media guidance application may compute a large distance if respective values in the first representation vector corresponding to respective values in the third representation vector are not similar. In contrast, the media guidance application may compute a small distance if respective values in the first representation vector are similar to respective values in the third representation vector (e.g., a difference between values within the first representation vector and corresponding values in the third representation vector are within a threshold value). For example, the media guidance application may compare the representation vector corresponding to the word "Locate" with the representation vector corresponding to the word "Where's" and may determine that the distance is small because both words refer to determining a place of an item.

The media guidance application computes a second distance between the second representation vector and the fourth representation vector in response to determining that the first distance is less than a first threshold distance. For example, the media guidance application may retrieve a first threshold from memory to determine whether the first word is similar to the third word. For example, the media guidance application may determine a first distance between the respective representation vectors of "Where's" and "Locate" as described above. The media guidance application may compare the value of the distance to a threshold to determine whether the words are similar. If the media guidance application determines that the words are similar, the media guidance application may compute a second distance between the second representation vector and the fourth representation vector. For example, the media guidance application may compute the second distance, as described above, to quantify how similar the second word, such as "Entourage" is to the fourth word, such as "media_X" because the first word of the input query matches the first word of the search query template.

The media guidance application selects the search query template in response to determining that the second distance is less than a second threshold distance. For example, the media guidance application may retrieve a second threshold from a remote database accessible to the media guidance application. The media guidance application may compare the second distance to the second threshold distance to determine whether the words are similar enough to use the search query template (e.g., if both words in the input query match words of the search query). If the second distance is less than the second threshold distance, the media guidance application may select the search query template to provide search results to the user.

The media guidance application retrieves search results based on the search query template. For example, the media guidance application may use the search query template to construct a query to a database comprising the locations of media. For example, the media guidance application may determine that because the first word of the user's search query matches the first word of the search query template, and because the second word of the user's search query matches the second word of the search query template, that the search query template should be used to retrieve search results.

In some embodiments, the media guidance application may include one of the two words from the input query in a query to a database. For example, the media guidance application may replace a word in the search query template with a word from the input query. The media guidance application may generate a search query based on the search query template (e.g., "Locate media_X") and may replace "media_X" with media that the user is trying to locate (e.g., "Entourage"). The media guidance application may transmit the query to a search database and may present results of the query to the user. For example, the media guidance application may transmit the query "Locate Entourage" over a network connection and may output audio over a speaker of the media guidance application describing a location of the media (e.g., based on the results of the query to the database).

In some embodiments, the media guidance application may identify a part of speech associated with the first word to determine whether the first word should be included in the query to the database. For example, the media guidance application may apply a part-of-speech tagging algorithm to the input query. The media guidance application may tokenize each word in the input query and may input a list of tokenized words to a part-of-speech tagger ("POS tagger") to retrieve a part of speech associated with each word. In an example, the media guidance application may determine that the second word is a subject of the input query. For example, the media guidance application may determine that "Entourage" is the subject of the input query. The media guidance application may replace the subject of the input query (e.g., "Entourage") with the subject of the search query template (e.g., "media_X") and may transmit the query to a remote database to retrieve search results.

In some embodiments, the media guidance application may ignore stop words in the input query. For example, the media guidance application may determine that an input query includes more than two words. The media guidance application may compare the first word of the input query to a list of stop words to determine whether the first word matches a stop word of the list of stop words. In response to determining that the first word matches the stop word, the media guidance application may select another word of the input query (e.g., a third word from the input query) and may compute a fifth representation vector for the third word of the input query (e.g., by determining degrees to which the third word of the input query matches features of the set of word features). The media guidance application may use the fifth representation vector instead of using the first representation vector because the first representation vector corresponds to a stop word.

In some embodiments, the media guidance application may compute the distance between the first representation vector and the third representation vector by comparing a first value in the first representation vector with a corresponding second value in the second representation vector. For example, the media guidance application may take the first value in an X dimension of the first representation vector and subtract the first value from a second value in the X dimension of the third representation vector. The media guidance application may store the difference at a location in memory. The media guidance application may iteratively select each element of the first and the third representation vector, may compute a difference, and may increment or decrement the distance variable based on the distance. The media guidance application may compare the first value with the second value to determine whether the first value and the second value differ by less than a threshold amount (e.g., when the media guidance application computes a difference of zero or when the difference is less than a threshold value stored in memory). If the media guidance application determines that the difference is less than the threshold value, the media guidance application may leave a value of the distance unchanged (or add zero). If the media guidance application determines that the first value and the second value differ by greater than the threshold amount, the media guidance application may compute a degree to which the values are dissimilar and may increment the distance based on the degree to which the values are dissimilar. For example, the media guidance may increment the distance by five when the difference between the two values is five.

In some embodiments, the media guidance application may compute the first distance between the first representation vector and the third representation vector based on an orientation of the first representation vector with respect to the third representation vector in a vector space. For example, the media guidance application may determine a number of elements in the first representation vector (e.g., N) and the third representation vector (e.g., N). In response to determining that a number of elements in the first representation vector is equal to a number of elements in the third representation vector (e.g., both vectors have N elements), the media guidance application may evaluate the first and the third representation vectors in a vector space of dimension N. The media guidance application may compute a distance in the vector space, such as a cosine similarity between the first and the third representation vector representing an angle between the vectors. When the angle between the first representation vector and the third representation vector is small, the media guidance application may determine that the vectors are similar. When the angle between the first representation vector and the third representation vector is large, the media guidance application may determine that the vectors are not similar.

In some embodiments, the media guidance application may determine that the first distance (e.g., between the first representation vector and the third representation vector) is smaller than a third distance between the second representation vector and the fourth representation vector when the first word matches a meaning of the third word and does not match a meaning of the fourth word. For example, as described above, the media guidance application may compute a cosine distance as the first and the third distance. The media guidance application may determine that a distance is smallest when two words have similar meaning and may determine that the distance is greatest when the words do not have similar meaning (e.g., based on the representation vectors capturing the meaning of the words).

In some embodiments, the media guidance application may determine that the first distance is greater than the first threshold distance, and may resultantly retrieve a second template for comparison. For example, the first search query template may comprise the search query "Who's person_X." The media guidance application may compute a distance between "Where's" (e.g., the first word) and "Who's" (e.g., a fifth word). The media guidance application may determine that "Who's" is not similar to "Where's" based on their respective representation vectors as described above.

In some embodiments, the media guidance application may retrieve the second search query template from a database comprising search query templates. For example, the media guidance application may retrieve a second search query template comprising the search query "Locate media_X." The media guidance application may retrieve the second search query template and may compute a respective fifth and sixth representation vectors, as described above, for a first word of the second search query template (e.g., "Locate") and a second word of the second search query template (e.g., "media_X").

In some embodiments, the media guidance application may compute a third distance between the first representation vector and the fifth representation vector, as described above, and may compare the third distance to the first threshold distance. In response to determining that the third distance is less than the first threshold distance, the media guidance application may compute a fourth distance between the second representation vector and the sixth representation vector (e.g., to determine whether the second word of the input query, "Entourage," matches a second word of the second search query template, "Media_X"). In response to determining that the fourth distance is less than the second threshold, the media guidance application may select the second search query template. Based on the second search query template, the media guidance application may create a query to a database to retrieve search results corresponding to an intent of the input query (e.g., to identify a location of the television show "Entourage"). The media guidance application may present the search results to the user by, for example, generating a display of media listings matching the user intent (e.g., media listings for Entourage).

In some embodiments, the media guidance application may generate for display the search results organized based on a layout associated with the search query template. For example, the media guidance application may retrieve a layout associated with the template (e.g., from a database) denoting how the search results should be presented to the user. For example, the media guidance application may retrieve an input query of "Where can I play the movie Zoolander?" The media guidance application may determine that the input query matches an intent to locate media (e.g., by matching the input query to a search query template as described above) and may generate for display tiles (e.g., in a mosaic) identifying media content providers having access to Zoolander. In contrast, the media guidance application may retrieve an input query "What are the current MLB standings?" The media guidance application may determine that the input query matches an intent to display statistics (e.g., by matching the input query to a search query template). In response to determining that the input query matches an intent to display statistics, the media guidance application may generate for display a table comprising MLB statistics.

It should be noted that the systems and/or methods described above may be applied to, or used in accordance with, other systems, methods, and/or apparatuses in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 shows illustrative database entries representing media and location search templates in accordance with some embodiments of the disclosure;

DETAILED DESCRIPTION OF DRAWINGS

Figure 1:
FIG. 1 shows an illustrative example of user equipment configured to receive a query from a user in accordance with some embodiments of the disclosure.

Systems and methods are provided herein for providing a media guidance system that recognizes a plurality of natural language queries as having a similar intent and generates search results matching the intent. For example, the media guidance application may provide an interface for voice or text based searching. The media guidance application may retrieve a plurality of different queries from a user each having the same intent. For example, due to natural variations in how humans speak, when a user is trying to identify the next time the television show "Game of Thrones" is going to air, the user may say "When is 'Game of Thrones' airing again?" or "What time can I catch the next episode of 'Game of Thrones' ?" or "Show me times I can watch episode five of 'Game of Thrones'", etc. The media guidance application may recognize each of the variations as an intent to identify when a next episode of "Game of Thrones" is airing. For example, the media guidance application may access a template in a database comprising a generalized intent for the user. For example, the generalized intent may be a request for a media schedule. The generalized intent may be associated with a plurality of words. Each of the plurality of words a may be associated with a vector in a multi-dimensional vector space, where words having similar meanings are mapped in close proximity within the vector space. The media guidance application may locate a template matching a search query by identifying words of a template that are in close proximity to words of the search query within the vector space. The media guidance application may generate a search query based on the template and may retrieve a variety of search results based on the generated query. Following from the previous example, the media guidance application may generate a query to a database comprising information about the broadcast schedule for "Game of Thrones." The media guidance application may retrieve search results based on the query and may generate for display the results. For example, the media guidance application may retrieve a schedule of airtimes for "Game of Thrones" and may generate for display the schedule and may highlight the airtime for the next available episode, or any other episode requested by the user.

The media guidance application may receive an input query via a user input device. For example, the media guidance application may connect to a physical or virtual keyboard (e.g., a keyboard generated on a display, where touch inputs on the display are correlated to characters by the media guidance application). The media guidance application may receive textual input via the keyboard comprising search queries, such as natural language search queries, and may match the natural language search queries to search templates to retrieve a set of search results. For example, the media guidance application may retrieve a query of "Show me Derek Jeter's batting statistics." The media guidance application may analyze the query and may determine that the user is requesting statistics for the baseball player Derek Jeter. In response to detecting that the user is requesting statistics for Derek Jeter, the media guidance application may retrieve statistics for Derek Jeter and may generate for display the statistics.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), notification information (e.g., text, images, media clips, etc.), on-demand information, blogs, websites, and any other type of guidance data that is helpful for a user to navigate among and locate desired content selections.

In some embodiments, control circuitry 704, discussed further in relation to FIG. 7 below, executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays discussed in relation to FIG. 1, FIG. 4, FIG. 5, and FIG. 6. In some implementations, any action performed by control circuitry 704 may be based on instructions received from the media guidance application.

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

FIG. 1 shows an illustrative embodiment of an example of user equipment configured to receive voice search, in accordance with some embodiments of the disclosure. User equipment 100 is depicted having system query 102 and user query 104.

In some aspects, user equipment 100 may comprise control circuitry (e.g., control circuitry 704) that executes a media guidance application for recognizing a plurality of natural language queries having a similar intent and generating search results matching the intent. User equipment 100 may have all the same capabilities of user television equipment 802, user computer equipment 804, and wireless user communications device 806 discussed further in relation to FIG. 8 below.

In some embodiments, the media guidance application retrieves a search input comprising at least two words from an input device. For example, the media guidance application may access a microphone or another sound transducer capable of converting sound waves to electrical signals to retrieve the search input (e.g., voice search input). The media guidance application may process an electrical signal retrieved from the microphone or sound transducer and to identify words in the electrical signal. For example, the media guidance application may be integrated into a device comprising a microphone (e.g., user equipment 100). The media guidance application may retrieve an audio wave signal from the microphone in response to a user speaking into the microphone. For example, the media guidance application may monitor the signal at the microphone (e.g., by polling a signal from the microphone or detecting an interrupt triggered by a sound input). If the sound at the microphone is above a threshold value (e.g., a threshold voltage for an analog audio signal or a threshold value for a digital signal), the media guidance application may perform a speech-to-text sequencing on the audio signal to generate a text string from the audio input.

In some embodiments, the media guidance application may perform speech-to-text sequencing on an audio signal to identify words in an audio signal. For example, the media guidance application may analyze the audio signal and may match the audio signal to a database listing audio phonemes (e.g., similar classes of sounds). For example, the difference between the words "bet" and "bat" may be captured by the phoneme "EH" versus "AE." In some embodiments, the media guidance application may filter or may transform the audio signal before performing the matching. For example, the media guidance application may filter the audio signal at the microphone. For example, the media guidance application may apply an analog filter (e.g., an analog filter that blocks a voltage signal that is not within a frequency of the human voice range) or may apply digital filtering (e.g., by applying a mathematical equation to a sequence of digital samples).

In some embodiments, the media guidance application may match the phonemes to a database of word-phoneme pairs. For example, the media guidance application may detect the phonemes "B," "EH," and "T" in an audio signal. The media guidance application may construct a series of tri-phonemes, di-phonemes, quad-phonemes, etc. (i.e., three, two, four phonemes, etc.) from the audio signal. For example, the media guidance application may construct the tri-phoneme "B-EH-T" based on detecting the phonemes "B," "EH," and "T" in the audio signal. The media guidance application may search a database comprising word-phoneme pairs to identify a word in the speech signal. For example, the media guidance application may match the tri-phoneme "B-EH-T" to a database entry having "B-EH-T" associated with the word "BET." The media guidance application may determine that the portion of the audio signal corresponding to the phonemes "B-EH-T" is associated with the word "BET."

In some embodiments, the media guidance application may process the audio input to create a text string of the words in the audio signal. For example, the media guidance application may perform a speech-to-text recognition algorithm on the voice input as described above. The media guidance application may identify a plurality of words and may form a string comprising each of the words detected in the audio signal. For example, the media guidance application may detect the words "Let's," "Go," and "Rovi" in the audio signal. In response to detecting the words "Let's," "Go," and "Rovi" the media guidance application may construct a string "Let's go Rovi."

In some embodiments, the media guidance application may monitor the audio signal for a sequence of words to initiate a search. For example, the media guidance application may wait until the media guidance application detects the sequence of words "Let's go Rovi" before the media guidance application begins to perform a search. For example, the media guidance application may generate for display system query 102 in response to detecting the sequence of words "Let's go Rovi." In some examples, the media guidance application may retrieve a search query from the user (e.g., user query 104) after retrieving a query to initialize a search (e.g., "Let's go Rovi"). In some embodiments, the media guidance application may initialize a search interface (e.g., a display comprising system query 102) in response to receiving a query to initialize the search, such as "Let's go Rovi."

The media guidance application may compute a first representation vector corresponding to a first word of the input query and a second representation vector corresponding to a second word of the input query. For example, the media guidance application may retrieve a query from a user via an audio interface as described above. The media guidance application may construct a string "Where's Entourage?" based on detecting words in an audio signal from a microphone of the media guidance application. The media guidance application may apply an algorithm to identify a vector representation for each word in the string. For example, the media guidance application may apply the algorithm to identify a meaning for each of the words in the string. For example, the contraction "Where's" may correspond to "where is" as in "Where's Waldo?", "where has" as in "Where's John been all week?", or "Where does" as in "Where's salt come from?" The media guidance application may identify three vectors for the contraction "Where's" each vector corresponding to a meaning of the contraction "Where's." In an example, the media guidance application may identify a vector corresponding to the word "Where's" based on neighboring words. For example, the media guidance application may determine that the word "scale" has a first meaning as in "A scale on a fish." and a second meaning as in "Weigh the book on the scale." The media guidance application may compute a representation vector for a word phrase including "scale" because a meaning of scale is dependent on its surrounding words.

In some embodiments, the media guidance application may analyze a corpus of words to construct a vector space for words in the corpus. For example, the media guidance application may retrieve a text corpus such as a set of search queries from a plurality of users. The media guidance application may identify distributional properties of each of the words in the corpus (e.g., corpus of search queries). For example, the media guidance application may analyze the corpus of search queries and may determine how frequently one word co-occurs with another word in the corpus. The media guidance application may determine an embedding for a word in the corpus based on the observed distributional prosperities. For example, a vector corresponding to the word "scale" as in "scale of a fish" may be similar to a vector corresponding to the word "fish" because, for example, the media guidance application may determine that the word "scale" frequently co-occurs with the word "fish."

In some embodiments, the media guidance application may analyze a training corpus comprising words associated with a user. For example, the media guidance application may retrieve a profile associated with the user comprising sentences or word fragments used by the user. For example, the media guidance application may log emails, text messages, and/or conversations of the user to create a corpus of text spoken, typed, read, etc. by the user. For example, the media guidance application may retrieve a user profile from memory. The media guidance application may determine whether a user profile exists by first identifying the user (e.g., login information, a picture of the user, a voice of the user, a hash value uniquely identifying the user or any other known identifying information of the user), and then by comparing the user's identity against entries of a user profile database. As a result of the comparison, the media guidance application may receive a pointer to a profile if one is located or may receive a NULL value if the profile does not exist. The user profile database may be located remote or local to the media guidance application (e.g., on storage 508 or on media guidance data source 618 accessed via communications network 614 described in relation to FIG. 5 and FIG. 6 below). If a user profile is located, the media guidance application may access database entries pointing to a corpus of text associated with the user. For example, the user may have a dog named "Entourage." The media guidance application may analyze the corpus associated with the user and may determine that the word "Entourage" frequently appears with other references to the user's pet (e.g., "Go fetch, Entourage" "Did you feed Entourage?" or "Take Entourage for a walk"). In response to this determination, the media guidance application may determine that a search query "Where's Entourage" would correspond to a request to identify a location of the user's pet, whereas for a second user who does not have a pet named Entourage, the media guidance application may determine that a query "Where's entourage?" corresponds to the television show "Entourage."

In some embodiments, the media guidance application may use a preexisting algorithm or set of algorithms to identify a vector representation for a word. For example, the media guidance application may utilize a neural network, such as a word-to-vector algorithm in a natural language processing toolkit accessible to the media guidance application, such as a Word2Vec neural network, to identify a vector representation for a word. The media guidance application may correlate a word identified in the search query with a representation based on the Word2Vec neural network. For example, the media guidance application may retrieve a search query comprising the words "Where's Entourage?" The media guidance application may compute a first vector for the word "Where's" and a second vector for the word "Entourage" based on the neural network.

In some embodiments, the media guidance application may identify a part of speech associated with the first word to determine whether the first word should be included in the query to the database. For example, the media guidance application may apply a part-of-speech tagging algorithm to the input query (e.g., using hidden Markov models). For example, the media guidance application may break up the search query into words or phrases using an algorithm to tokenize the search query. The media guidance application may input a list of the tokenized words to a part of speech tagger ("POS tagger") to retrieve a part of speech associated with each word. In an example, the media guidance application may determine that the second word is a subject of the input query. For example, the media guidance application may determine that "Entourage" is the subject of the input query.

In some embodiments, the media guidance application may ignore stop words in the input query. For example, the media guidance application may determine that a word of the query is a stop word based on applying the POS tagging algorithm as described above. The media guidance application may skip producing a vector representation for a word if the media guidance application determines that the word is a stop word (e.g., because the word does not add meaning to the search query). For example, the media guidance application may compare the first word of the input query to a list of stop words to determine whether the first word matches a stop word of the list of stop words. In response to determining that the first word matches the stop word, the media guidance application may select another word of the input query (e.g., a third word of the input query) and may compute a representation vector for the third word of the input query. The media guidance application may use the fifth representation vector instead of wasting processing resources trying to compute a first representation vector for the first word.

Figure 2:
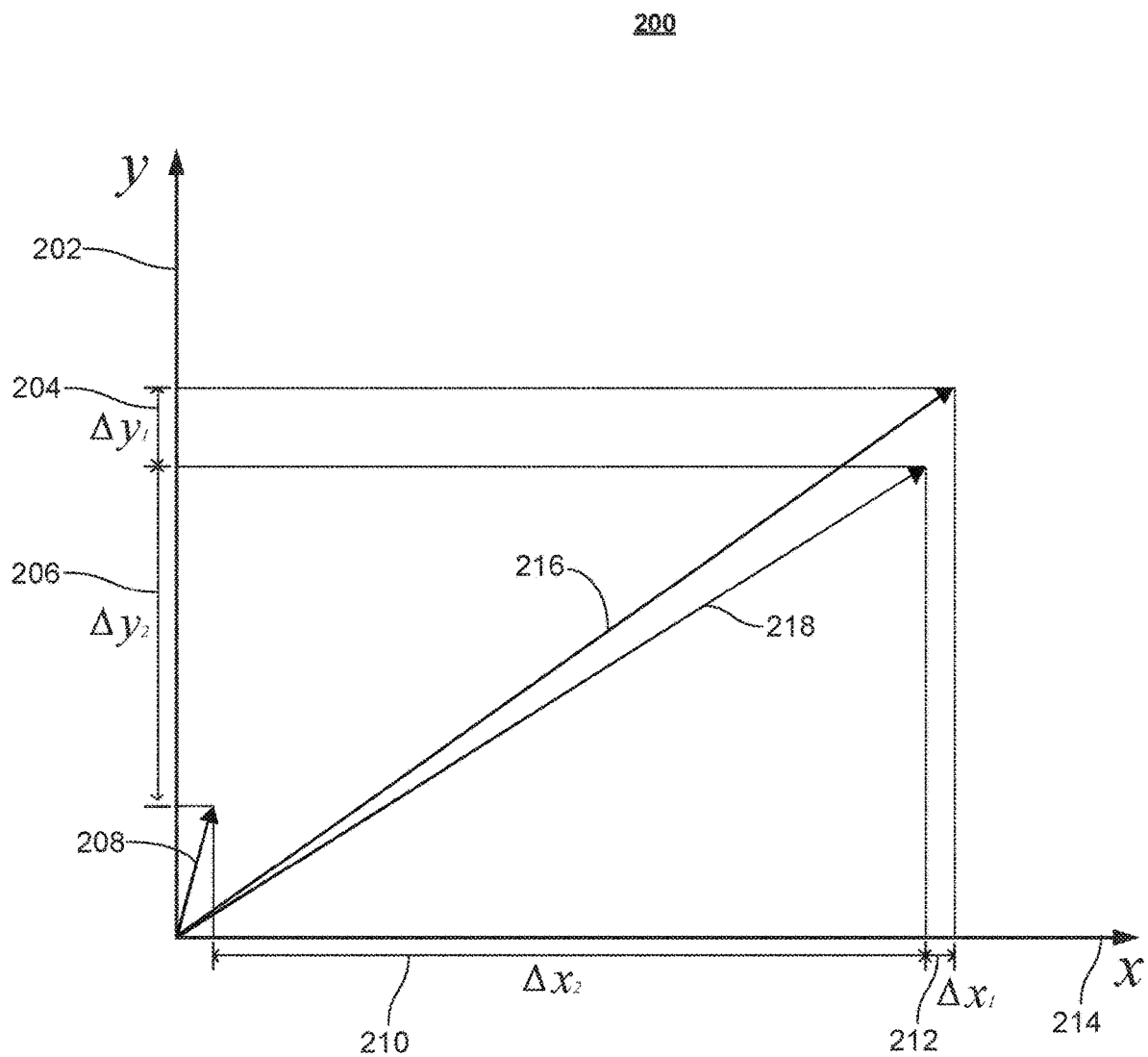
FIG. 2 shows an illustrative example of word representation vectors in a two-dimensional vector space in accordance with some embodiments of the disclosure.

FIG. 2 shows word representation vectors in a two-dimensional vector space in accordance with some embodiments of the disclosure. Graph 200 is depicted having y dimension 202 and x dimension 214. In some embodiments, y dimension 202 and x dimension 214 represent features of words detected by the media guidance application in analyzing a word corpus as described above. A value within y dimension 202 or x dimension 214 may represent a degree to which a word matches a feature represented by the dimension. For example, if a word matches a feature of x dimension 214 closely, the media guidance application may assign a high value on the x dimension of a representation vector corresponding to the word. For example, a feature may be a probability, such as a likelihood of finding a word in close proximity to word features or phrases. For example, the media guidance application may determine that the x dimension corresponds to a probability that a word frequently appears close to nouns or appears close to animal names. A value in the x dimension may be computed based on evaluating the corpus and determining a probability that the word appears close to the word feature or phrase. For example, the media guidance application may count a total number of times the word appears in the corpus and may determine that the probability is the number of times the word appears in close proximity to the word feature or phrase with respect to the total number of times the word appears in the corpus.

Graph 200 is further depicted having representation vectors 218, 216 and 208. In some embodiments, the media guidance application may compute representation vectors 218, 216 and 208 based on an embedding for a word within a neural network as described above. The media guidance application may compute a first value in y dimension 202 and a second value in x dimension 214 for a representation vector within a 2-dimensional vector space represented by y dimension 202 and x dimension 214. For example, the media guidance application may compute a Y value for the representation vector based on how closely the word matches the word feature corresponding to y dimension 202 and may compute an X value based on how closely the word matches the word feature corresponding to x dimension 214. In this exemplary figure, only two word features are depicted for simplicity. However, the media guidance application may compute representation vectors in any number of dimensions (e.g., 3 dimensions, 200 dimensions, etc.).

In some embodiments, the media guidance application may compute a difference between values within a dimension. Graph 200 is depicted having difference 204, 206, 210 and 212, each difference representing a similarity between representation vectors 216, 218 and/or 208 in either x dimension 214 or y dimension 202. The media guidance application may compute difference 204 based on a difference in y dimension 202 between representation vector 216 and representation vector 218. The media guidance application may compute difference 206 based on a difference in y dimension 202 between representation vector 208 and representation vector 218. The media guidance application may compute difference 210 based on a difference in x dimension 214 between representation vector 218 and representation vector 208. The media guidance application may compute difference 212 based on a difference in x dimension 214 between representation vector 218 and representation vector 216.

In some embodiments, the media guidance application may match a search query (e.g., user query 104) to a search query template to retrieve search results. For example, the media guidance application may receive search queries "Where's Entourage?," "Find streaming locations for Entourage," or "Which channel is Entourage on?" and may match each search query to a template for finding a location where a user can access media, such as the television show "Entourage."

FIG. 3 shows illustrative database entries representing search templates, in accordance with some embodiments of the disclosure. Database 300 is depicted having two entries, entry 316 and entry 318. Entry 316 corresponds to search intent 302, associated with a media location search. Entry 316 is further associated with database 304. Database 304 may be used by the media guidance application to perform a search having search intent 302. For example, the media guidance application may select entry 316 when the media guidance application performs a search to identify where a movie is located. The media guidance application may select database 304 for performing the search because database 304 is associated with search intent 302 (e.g., an intent to locate media). Entry 316 is further depicted having a search query template 306. The media guidance application may use search query template 306 to structure a query to database 304 when performing a search having search intent 302. For example, when the media guidance application is performing a search to identify a location of media (e.g., a search matching search intent 302), the media guidance application may search database 304 using a query formatted based on search query template 306. For example, when the input query is "Where's Entourage?" the media guidance application may identify the search query as a request to locate media locations for "Entourage." The media guidance application may search for the "Entourage" by creating a query "Locate Entourage" and transmitting the query to the database 304 (e.g., media guidance data database). The media guidance application may match user query 104 (e.g., "Where's Entourage") to entry 316 based on matching representation vectors associated with user query 104 (e.g., representation vectors for "Where's" and "Entourage" to representation vectors associated with words of the query template (e.g., representation vectors 308 and 310). For example, entry 316 is depicted as having associated representation vector 308, corresponding to the word "Locate", and representation vector 310, corresponding to the word "Media". The media guidance application may match a representation vector corresponding to the word "Where's" with a representation vector corresponding to the word "Locate." Likewise the media guidance application may match a representation vector corresponding to the word "Entourage" with a representation vector corresponding to the word "media" (e.g., because the respective words have similar meanings and are therefore located in close proximity in the vector space).

The media guidance application may retrieve a search query template (e.g., search query template 306) relating to a search intent from a database (e.g., search intent 302). For example, the media guidance application may generate representation vectors for words of a user search query and may match the representation vectors of the words of the search query with representation vectors stored in the database (e.g., database 300). For example, the media guidance application may compute a first representation vector corresponding to a first word of the search query (e.g., "Where's") and may compute a third representation for a second word of the search query (e.g., "Entourage"). The media guidance application may compute a third representation vector corresponding for a third word corresponding to a database entry (e.g., entry 316 corresponding to media location search intent). For example, the media guidance application may compute a third representation vector for the word "Locate" corresponding to entry 316. The media guidance application may compute a fourth representation vector corresponding to a fourth word, such as "media" associated with entry 316. As described above, values in the third and the fourth representation vectors may represent how closely the third word and the fourth word match features of a set of word features (e.g., a feature corresponding to x dimension 214 and corresponding to y dimension 202).

The media guidance application may determine whether a first representation vector matches a second representation vector by computing a distance between the two vectors. For example, the media guidance application may compute a first distance between the first representation vector (e.g., a representation vector for the word "Where's") and the third representation vector (e.g., a representation vector for the word "locate"). The media guidance application may compute the distance to create a metric for comparing how similar the first representation vector is to the third representation vector (e.g., to determine how closely the term "Where's" matches a use of the word "location." The media guidance application may compute an overall distance between each representation vector based on a similarity of each respective vector values in each dimension. For example, the media guidance application may compute a distance between two representation vectors in x dimension 214 and may compute a distance between two representation vectors in y dimension 202. An overall distance between the two vectors may be computed based on a sum of the distance in the x dimension and the y dimension. For example, the media guidance application may compute a difference in x dimension 214 between representation vector 216 and representation vector 218 by retrieving a value in the x dimension corresponding to each of representation vector 216 and 218 and subtracting the values. The media guidance application may compute a distance graphically represented by difference 212. In an example, the media guidance application may compare the representation vector corresponding to the word "Locate" with the representation vector corresponding to the word "Where's" and may determine that the distance is small because both words can be associated with a identifying a place of an item and are therefore have vectors in close proximity in the vector space.

The media guidance application may compute a second distance between the second representation vector and the fourth representation vector in response to determining that the first distance is less than a first threshold distance. For example, the media guidance application may retrieve a first threshold from memory to determine whether the first word is similar to the third word. For example, the media guidance application may determine a first distance between the respective representation vectors of "Where's" and "Locate" as described above. The media guidance application may compare the value of the distance to a threshold to determine whether the words are similar. If the media guidance application determines that the words are similar, the media guidance application may compute a second distance between the second representation vector and the fourth representation vector (e.g., a distance in y dimension 202). For example, the media guidance application may compute the second distance, similarly to above, to quantify how similar the second word, such as "Entourage" is to the fourth word, such as "media."

In some embodiments, the media guidance application may compute the distance between the first representation vector and the third representation vector by computing distances between corresponding values for each dimension of a representation vector. For example, the media guidance application may take the first value from the first representation vector (e.g., a value in dimension N) and subtract the first value from a second value from the third representation vector also from dimension N. The media guidance application may store the difference at a location in memory. The media guidance application may iteratively select each element of the first and the third representation vector, may compute a difference, and may increment or decrement the distance variable based on the difference. For example, for each dimension, the media guidance application may increment the distance variable by a difference computed between the values in the N dimension of the first and the second representation vector.

In some embodiments, the media guidance application may compare the first value with the second value to determine whether the first value is within a threshold value of the second value (e.g., when the media guidance application computes a difference of zero). For example, the media guidance application may determine that a distance between the first value and the second value is 5. When the media guidance application determines that the distance is small (e.g., less than the threshold value retrieved from memory), the media guidance application may not increment the distance. For example, when the media guidance application determines that the difference is zero (e.g., less than a threshold value of 1), the media guidance application may leave a value of the distance unchanged (e.g., add zero). If the media guidance application determines that the first value is not within the threshold distance of the second value, the media guidance application may compute a degree to which the values are dissimilar and may increment the distance based on the degree to which the values are dissimilar. For example, the media guidance application may compute distance based on a tiered scale of the difference. For example, the media guidance application may increment the distance by zero when the difference is between zero and one. The media guidance application may increment the distance by five when the difference is between one and two (e.g., to minimize an effect on the distance for vectors that are similar in a dimension but amplify an effect on the distance when the vectors are dissimilar in the dimension).

In some embodiments, the media guidance application may compute the first distance between the first representation vector and the third representation vector based on an orientation of the first representation vector with respect to the third representation vector in a vector space. For example, the media guidance application may determine a number of elements in the first representation vector (e.g., N) and the third representation vector (e.g., N). In response to determining that a number of elements in the first representation vector is equal to a number of elements in the third representation vector (e.g., both vectors have N elements), the media guidance application may evaluate the first and the third representation vectors in a vector space of dimension N. The media guidance application may compute a distance in the vector space, such as a cosine similarity between the first and the third representation vector, where an angle between the vectors represents the distance. When the angle between the first representation vector and the third representation vector is small, the media guidance application may determine that the vectors are similar. When the angle between the first representation vector and the third representation vector is large, the media guidance application may determine that the vectors are not similar.

In some embodiments, the media guidance application may determine that the second distance (e.g., between the second representation vector and the fourth representation vector) is smaller than a third distance between the second representation vector and a fifth representation vector (e.g., a representation vector corresponding to a word of a second template) when the second word matches a meaning of the fourth word and does not match a meaning of the fifth word.

For example, as described above, the media guidance application may compute the second distance between the second representation vector (e.g., representation vector for the word "Entourage") and the fourth representation vector (e.g., representation vector for the word "media"). In an example, the media guidance application may compute a distance between a fifth representation vector, such as representation vector 314 corresponding to the word POI. The media guidance application may determine that a distance is smallest when two words have similar meaning (e.g., "Entourage" and "media" may have similar representation vectors because "Entourage" and "media" likely co-occurred in similar contexts in the training corpus) and may determine that the distance is greatest when the words do not have similar meaning (e.g., "Entourage" and "POI" may have dissimilar representation vectors because "Entourage" and "POI" likely do not appear in similar context in the corpus.

The media guidance application may select the search query template in response to determining that the second distance is less than a second threshold distance. For example, the media guidance application may retrieve a second threshold from a remote database accessible to the media guidance application. The media guidance application may compare the second distance to the second threshold distance to determine whether the words are similar enough to use the search query template (e.g., if both words in the input query match words of the search query). If the second distance is less than the second threshold distance, the media guidance application may select the search query template to provide search results to the user.

In some embodiments, the media guidance application may determine that the first distance is greater than the first threshold distance, and may resultantly retrieve a second template for comparison. For example, the first search query template may comprise the search query "Who's person." The media guidance application may compute a distance between "Where's" (e.g., the first word) and "Who's" (e.g., a fifth word). The media guidance application may determine that "Who's" is not similar to "Where's" based on their respective representation vectors as described above.

In some embodiments, the media guidance application may retrieve the second search query template from a database comprising search query templates. For example, the media guidance application may retrieve a second search query template comprising the search query "Locate media." The media guidance application may retrieve the second search query template and may compute a respective fifth and sixth representation vector, as described above, for a first word of the second search query template (e.g., "Locate") and a second word of the search query template (e.g., "media").

In some embodiments, the media guidance application may compute a third distance between the first representation vector and the fifth representation vector, as described above, and may compare the fifth distance to the first threshold distance. In response to determining that the third distance is less than the first threshold distance, the media guidance application may compute a fourth distance between the second representation vector and the sixth representation vector (e.g., to determine whether the second word of the input query, "Entourage," matches a second word of the second search query template, "media"). In response to determining that the fourth distance is less than the second threshold, the media guidance application may select the second search query template.

The media guidance application may retrieve search results based on the search query template. For example, the media guidance application may use the search query template to construct a query to a database comprising the locations of media. For example, the media guidance application may determine that because the first word of the user's search query matches the first word of the search query template, and because the second word of the user's search query matches the second word of the search query template, that the search query template should be used to retrieve search results.

In some embodiments, the media guidance application may rank corresponding templates based on the distance. For example, the media guidance application may determine that the search query "Where's Entourage" has an overall distance of five to entry 316 and has an overall distance of fifteen to entry 318 (e.g., by computing a distance for each dimension of the vector and summing the distances). The media guidance application may rank entry 316 higher with respect to entry 318 because the distance five is less than the distance of fifteen. The media guidance application may select the search query template corresponding to entry 316 rather than entry 318 because of the higher ranking of entry 316 with respect to entry 318.

In some embodiments, the media guidance application may use the search query template to query a database associated with the template. For example, the media guidance application may use the template and may include one of the two words from the input query to form a query to a database (e.g., database 304 used to retrieve search results when trying to identify a media location). For example, the media guidance application may replace a word in the search query template with a word from the input query. The media guidance application may generate a search query based on the search query template (e.g., "Locate media") and may replace "media" with a word from the user search query most closely matching the word "media" (e.g., the word from the user search query having the smallest distance to media). The media guidance application may transmit the query to a search database (e.g., database 304) identified in the database entry and may present results of the query to the user. For, example, the media guidance application may transmit the query "Locate Entourage" over a network connection. In some embodiments, the media guidance application may retrieve search results based on the query and may present the search results to the user. For example, the media guidance application may output audio over a speaker of the media guidance application describing a location of the media (e.g., based on the results of the query to the database).

Figure 4:
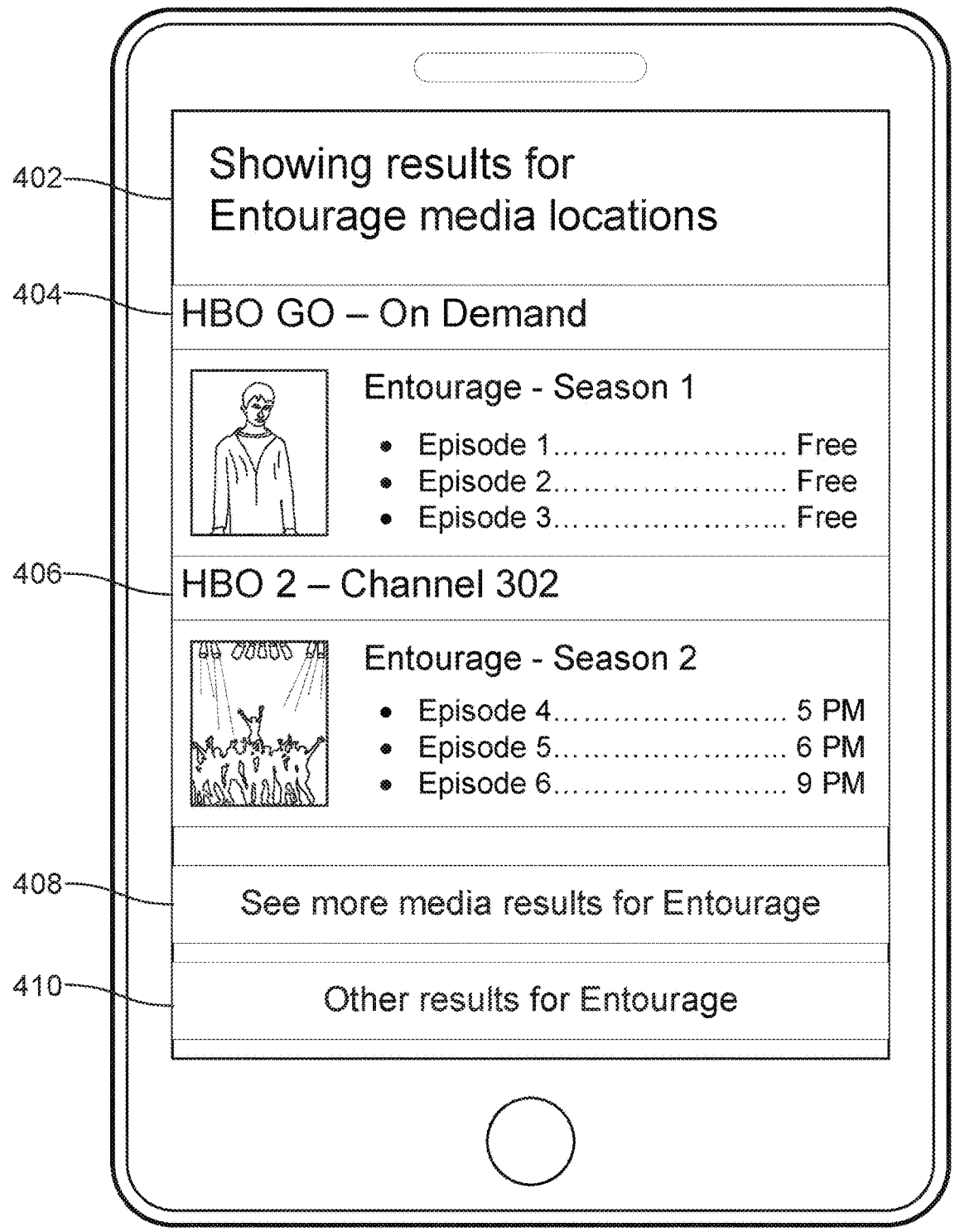
FIG. 4 shows an illustrative example of user equipment displaying search results retrieved based on a search query template matching a query input by a user in accordance with some embodiments of the disclosure.

FIG. 4 shows an illustrative example of user equipment displaying search results retrieved based on a search query template matching a query input by a user in accordance with some embodiments of the disclosure. User equipment 400 is depicted having search result 404 and search result 406 corresponding to the search indent 402. User equipment 400 is also depicted having option 408 and option 410 which, when selected, cause the media guidance application to retrieve more search results based on the intent or retrieve search results based on a different intent. For example, the media guidance application may optionally generate for display intent 402 corresponding to an intent predicted by the media guidance application based on matching words of the search query to words of a search query template. The media guidance application may optionally generate for display search result 404 corresponding to an on-demand offering for the show "Entourage" in response to receiving information from the database indicating the availability of an on-demand version of "Entourage." The media guidance application may optionally generate for display search result 406 corresponding to a broadcast version of the show "Entourage" in response to receiving scheduling information about the television show "Entourage." The media guidance application may optionally generate for display option 408 when additional search results corresponding to the television show "Entourage" are available. The media guidance application may optionally generate for display option 410 in response to determining that the user search query matches a second template within a threshold amount. For example, the media guidance application may determine that, for the user with the pet named "Entourage," the query "Where's Entourage" matches both the intent to search for media and an intent to locate the pet. The media guidance application may therefore generate an option for the user to perform a search using a different intent (e.g., via option 410).

In some embodiments, the media guidance application may generate for display the search results organized based on a layout associated with the search query template (e.g., on user equipment 400). For example, the media guidance application may retrieve a layout associated with the template (e.g., from entry 316), denoting how the search results should be presented to the user. For example, the media guidance application may retrieve an input query of "Where can I watch Entourage?" The media guidance application may determine that the input query matches an intent to locate media (e.g., by matching the input query to a search query template as described above) and may generate for display tiles comprising information about identified media (e.g., search result 404 or 406). In contrast, the media guidance application may retrieve an input query "What are the current MLB standings?" The media guidance application may determine that the input query matches an intent to display statistics (e.g., by matching the input query to words associated with search query template for sports statistics). In response to determining that the input query matches an intent to display statistics, the media guidance application may generate for display a table comprising sports statistics, an image of the player, information about media associated with the MLB.

Although the examples herewith have been described in relation to two dimensions with two words, user search queries, templates, etc. may be associated with any number of words. Representation vectors of the plurality of words associated with a template may be associated with any number of dimensions based on a neural network embedding of the word.

Figure 5:
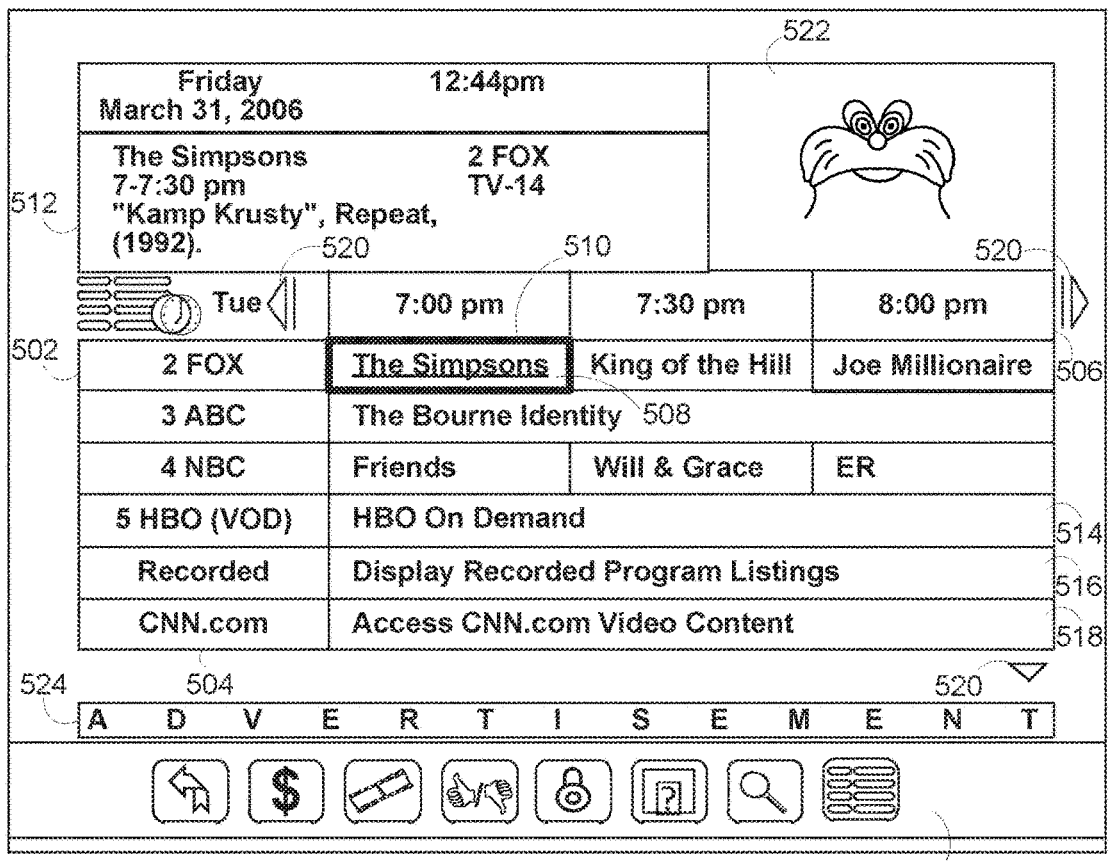
FIG. 5 shows an illustrative example of a media guidance display that may be presented in accordance with some embodiments of the disclosure.
Figure 6:
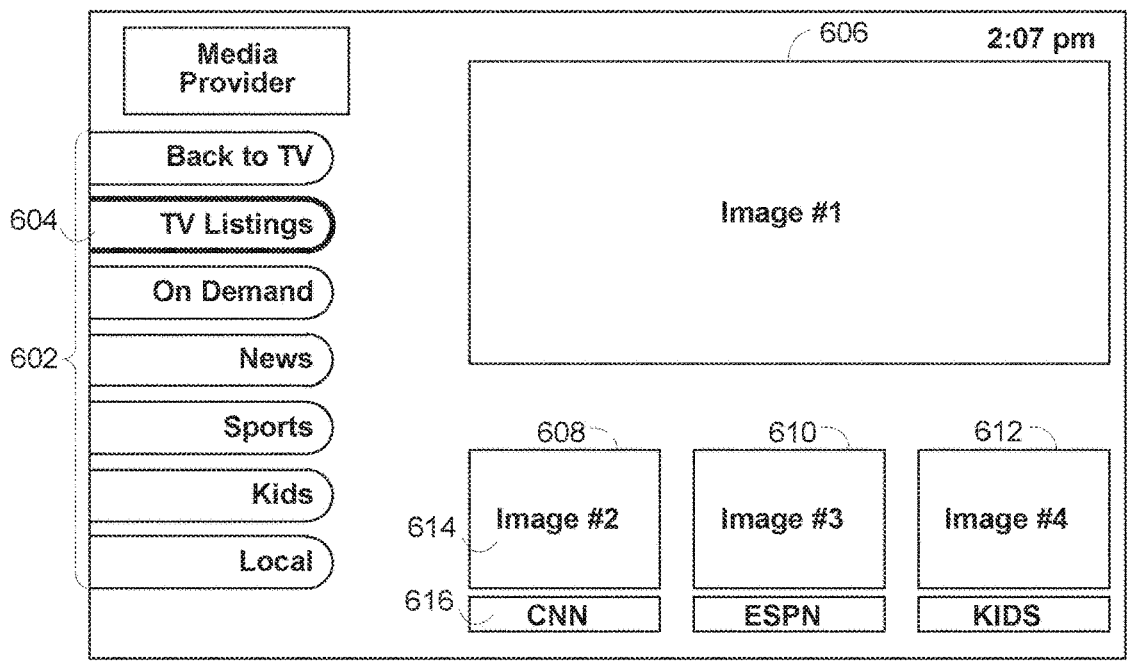
FIG. 6 shows another illustrative example of a media guidance display that may be presented in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listings associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Control circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
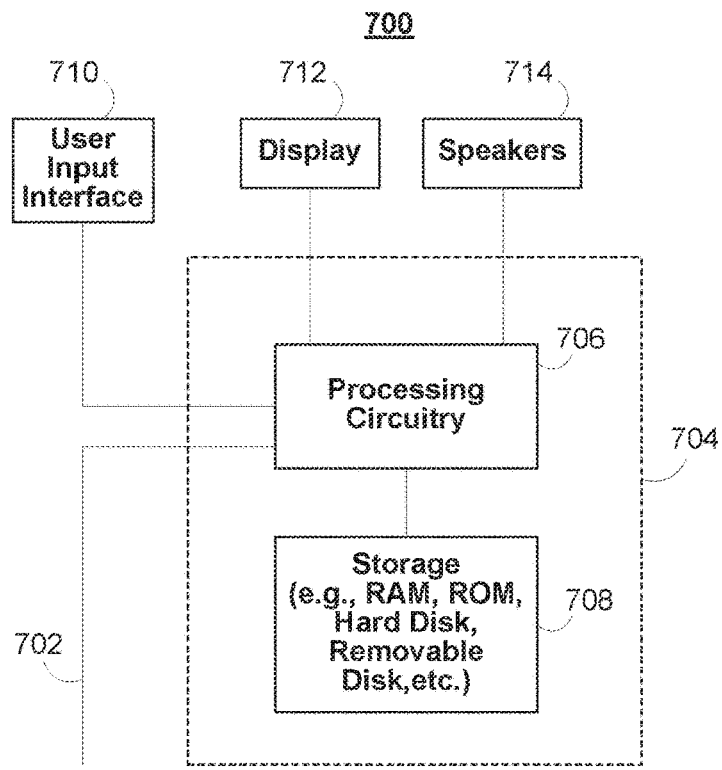
FIG. 7 is a block diagram of an illustrative user equipment device in accordance with some embodiments of the disclosure.
Figure 8:
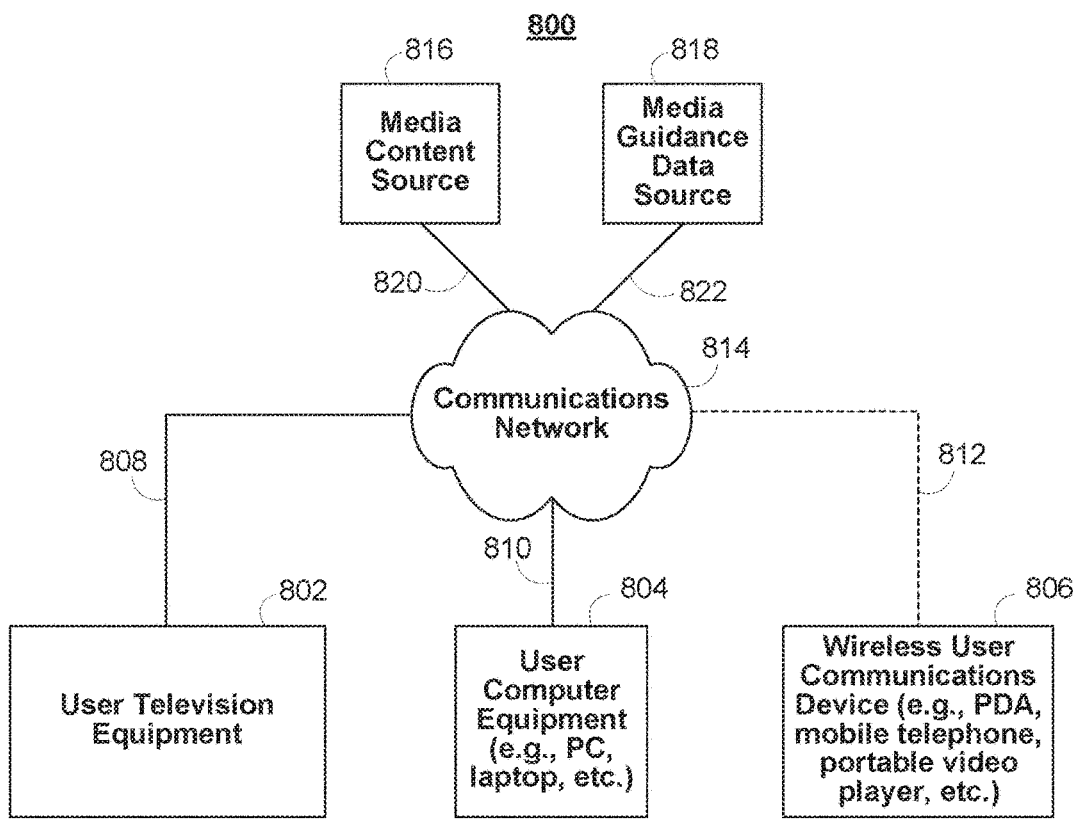
FIG. 8 is a block diagram of an illustrative media system in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively.

Communications network 814 may be one or more networks including the Internet, a mobile phone network, mobile voice or data network (e.g., a 4G or LIB network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment 802, 804, and 806 are shown as through communications network 814, in some embodiments, sources 816 and 818 may communicate directly with user equipment 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

Figure 9:
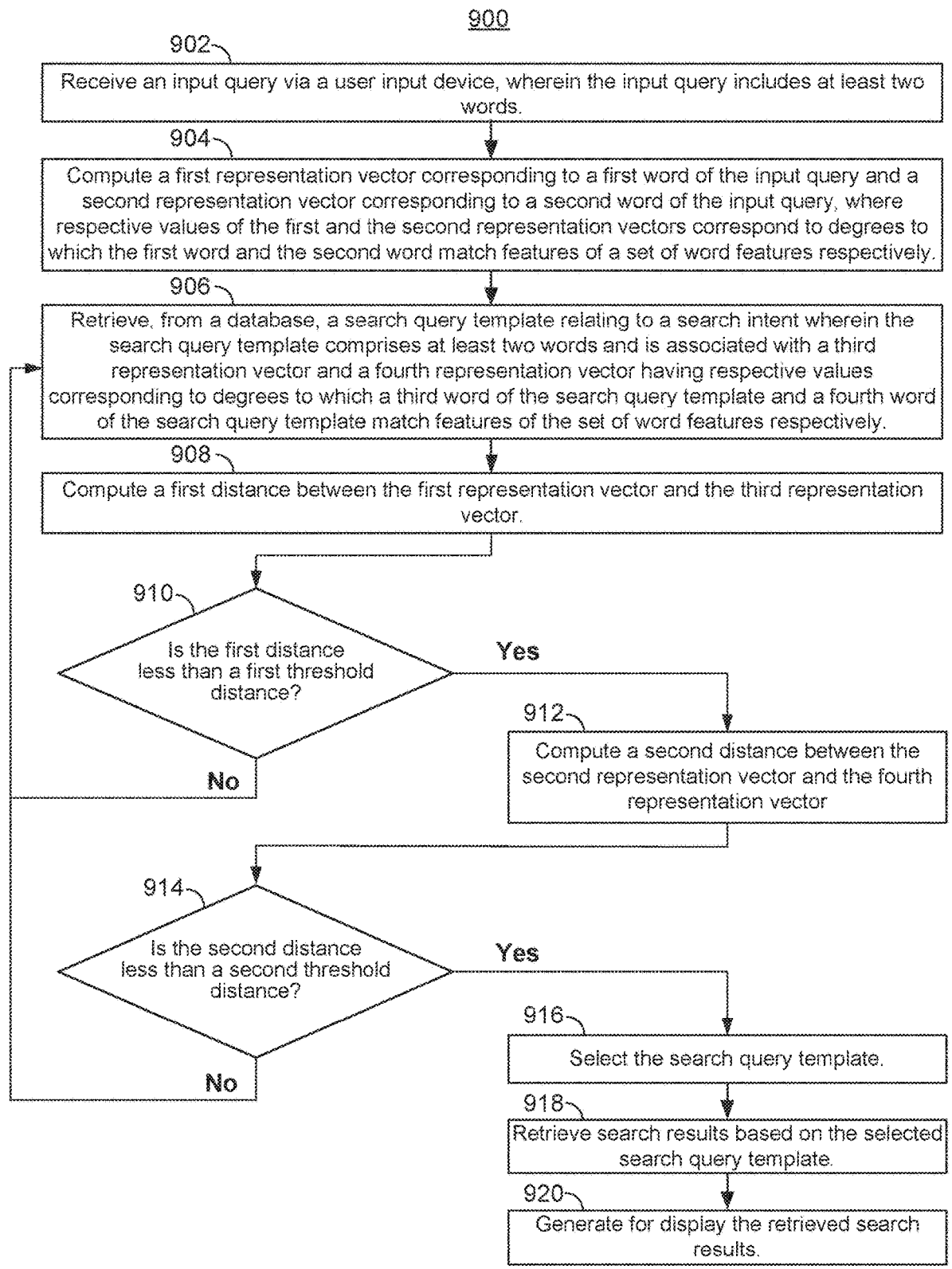
FIG. 9 is a flowchart of illustrative steps for generating search results based on an approximate template match in accordance with some embodiments of the disclosure.

FIG. 9 is a flowchart of illustrative steps for recognizing a plurality of natural language queries as having a similar intent and providing search results matching the intent in accordance with some embodiments of this disclosure. Process 900 begins at step 902 where the media guidance application implemented on user equipment 100, 400, 802, 804, and/or 806 executed by control circuitry 704 receives an input query via a user input device (e.g., user input interface 710) where the input query includes at least two words. For example, the media guidance application may receive sound input via user input interface 710 from a microphone connected to user input interface 710. The media guidance application may perform a speech-to-text transform on the sound input by a user via input interface 710.

At step 904, the media guidance application computes a first representation vector corresponding to a first word of the input query and a second representation vector corresponding to a second word of the input query, where respective values of the first and the second representation vectors correspond to degrees to which the first word and the second word match features of a set of word features respectively. For example, the media guidance application may analyze a corpus of text and may identify distributional properties of co-occurring words. For example, the media guidance application may determine that for a corpus corresponding to a first user with a dog named "Gladiator," the word "Gladiator" will co-occur with other words related to dogs because the user may frequently discuss the dog "Gladiator" but may not discuss gladiators of the Roman Empire. However, for a user that is a history buff, the media guidance application may retrieve a corpus associated with the user where the word "gladiator" may co-occur with words related to Rome and the Roman Empire, because the second user may frequently discusses gladiators in relation to the Roman Empire but not in relation to a dog name. The media guidance application may identify an embedding for words in a multi-dimensional space where words having similar factors will be located closely in the multi-dimensional space.

At step 906, the media guidance application retrieves, from a database, a search query template relating to a search intent where the search query template includes at least two words and is associated with a third representation vector and a fourth representation vector having respective values corresponding to degrees to which the third word of the search query template and a fourth word of the search query template match features of the second of the word features respectively. For example, the media guidance application may retrieve a search query template associated with a plurality of words, each word having a respective representation vector. The media guidance application may compare representation vectors corresponding to a search query (e.g., the first and the second representation vector) with representation vectors corresponding to words associated with the template (e.g., the third and the fourth representation vector, which correspond to words of the search query template).

At step 908, the media guidance application computes a first distance between the first representation vector and the third representation vector. For example, the media guidance application may compare the first representation vector with the third representation vector by comparing a similarity between values within each vector (e.g., compare values on an x dimension in the first vector to values on the x dimension in the second vector) to determine an overall similarity between the two vectors.

At step 910, the media guidance application determines whether the first distance is less than a first threshold distance. For example, the media guidance application may retrieve a threshold distance from memory, such as storage 708 or from a remote database, such as media guidance data source via communications network 822. For example, the media guidance application may rank all templates based on how closely words of the search query match words associated with the template. The media guidance application may set the threshold based on a distance between the representation vector for a first word of the query and third word of the template having the highest ranking. When the media guidance application determines that the distance is less than the threshold, the media guidance application proceeds to step 912. Otherwise the media guidance application may retrieve another template from the database (e.g., a database located at storage 708, or at media guidance data source 818 via communications network 814) and may return to step 906.

At step 912, the media guidance application computes a second distance between the second representation vector and the fourth representation vector. For example, the media guidance application may compute a distance between a representation vector of a second word of a search query and a representation vector of a second word associated with a template by computing an angle between the two vectors using a cosine difference as described above.

At step 914, the media guidance application determines whether the second distance is less than a second threshold distance. For example, the media guidance application may compute the second threshold difference in a similar manner to the first threshold distance, or may retrieve a predefined threshold value from memory, such as storage 708 or from media guidance data source 818 via communications network 814. If the media guidance application determines that the distance is less than the threshold value, the media guidance application proceeds to step 916. Otherwise, the media guidance application proceeds to step 906 and retrieves another template from a database (e.g., because a current template did not match within a threshold amount).

At step 916, the media guidance application selects the search query template. For example, the media guidance application may retrieve from the database (e.g., database as storage 708 or media guidance data source 818 via communications network 814) fields associated with a database entry corresponding to the template. For example, the media guidance application may retrieve entry 316 from database 300 located at media guidance data source 818 via communications network 814. The media guidance application may access a search query template field (e.g., search query template 306) and may generate a query based on the template. For example, the media guidance application may identify a word in the template matching a word in the query and may replace a word from the template with a word from the query. For example, the media guidance application may identify the word "Entourage" to replace the word "media" in search query template 306 when the user is searching for the television show "Entourage."

At step 918, the media guidance application retrieves search results based on the selected search query template. For example, the media guidance application may generate a query by replacing a word in the template with a word of the search query, as described above, and may transmit the query via a network connection to a database corresponding to the template. For example, the media guidance application may transmit the query to database 304 to identify a location for media. In some embodiments, the media guidance application may access database 304 locally (e.g., via processing circuitry 706 in storage 708) or remotely (e.g., via communication network 814 in media guidance data source 818).

At step 920, the media guidance application generates for display the retrieved search results. For example, the media guidance application may generate for display search results 404 and 406 retrieved from database 304. In some embodiments, the media guidance application may synthesize sound using a text-to-speech algorithm and may generate audio output corresponding to the search results (e.g., search results 404 and search results 406). For example, the media guidance application may generate an audio wave for output on speakers 714 comprising synthesized words corresponding to search results 404, such as an audio wave comprising the terms "Entourage Season 1 available on HBO GO—On Demand" In some embodiments, when another template also matches the search query closely (e.g., a first template ranked higher by the media guidance application than a second template when the distances are within a threshold value), the media guidance application may prompt the user as to whether the user wants to view additional search results based on the different template. For example, the media guidance application may generate for display option 410 on user equipment 400 or may prompt the user using an audio synthesized using a text-to-speech algorithm as described above. In some embodiments, the media guidance application may wait for user input requesting further search results and may generate for display further search results in response to receiving selection of option 410 (e.g., via an input on a touchscreen via user input interface 710), or in response to received audio received via a microphone of user input interface 710.

Figure 10:
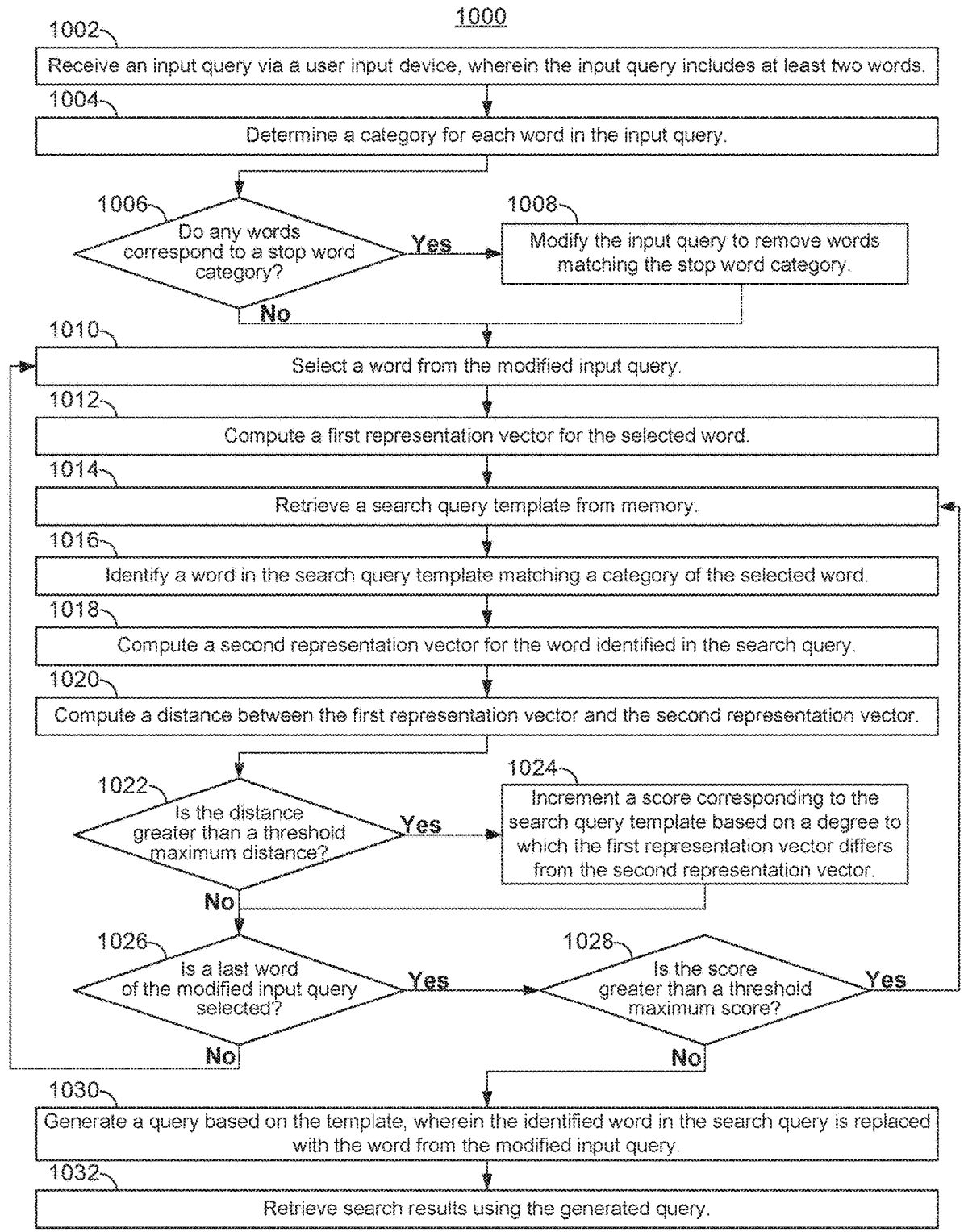
FIG. 10 is a flowchart of illustrative steps for selecting a search query template in accordance with some embodiments of this disclosure.

FIG. 10 is a flowchart of illustrative steps for selecting a search query template in accordance with some embodiments of this disclosure. Process 1000 begins at step 1002 where the media guidance application implemented on user equipment 100, 400, 802, 804, and/or 806 executed by control circuitry 704 receives an input query via a user input device (e.g., user input interface 710) that includes at least two words. For example, the media guidance application may receive sound input via user input interface 710 from a microphone connected to user input interface 710. The media guidance application may perform a speech-to-text transform on the sound input by a user via input interface 710 to generate a string of words associated with the user input.

At step 1004, the media guidance application determines a category for each word in the input query. For example, the media guidance application may analyze an association between each word in the query using a part-of-speech detection algorithm. For example, the media guidance application may determine a category for each word in the input query based on a part of speech for each word in relation to the other words in the sentence. For example, for the query "Play Entourage" the media guidance application may determine that the word "Entourage" is a noun and a subject of the query and may accordingly associate "Entourage" with a subject category. In another example, the media guidance application may determine that "Find" is an action verb and, in response to determining that "Find" is an action verb, may associate "Find" with an action verb category. In some embodiments, the media guidance application may compare each word in the query to a list of stop words stored in memory, such as in storage 708 or in media guidance data source 818 via communications network 814. If the media guidance application determines that a word matches a word from the list of stop words, the media guidance application may associate the word in the query with a stop word category.

At step 1006, the media guidance application determines whether any words correspond to a stop word category. For example, as described above, the media guidance application may compare words of the query to words in a list of stop words. If a word in the query matches a word in the list of stop words, the media guidance application may determine that the word corresponds to a stop word category. For example, the media guidance application may receive a query "When are the Yankees playing?" The media guidance application may determine that the words "are" and "the" are stop words based on comparing the words to a list of stop words or by using a part-of-speech tagging algorithm as described above. If the media guidance application determines that a word corresponds to the stop words category, the media guidance application proceeds to step 1008. Otherwise, the media guidance application proceeds to step 1010.

At step 1008, the media guidance application modifies the input query to remove words from the input query matching the stop word category. Following from the previous example, when the media guidance application receives the query "When are the Yankees playing?" the media guidance application may determine that the words "are" and "the" are stop words. The media guidance application may create a modified query excluding the stop words by removing the stop words from the user's original query and keeping words in the user's original query that do not correspond to a stop words category. For example the media guidance application may modify the input query "When are the Yankees playing?" to be "When Yankees playing?" so that the system does not waste resources processing terms in the query that do not assist in matching the input query to a template.

At step 1010, the media guidance application selects a word from the modified input query. For example, the media guidance application may incrementally select each word of the modified query (e.g., select the first word in a sequence of words in the modified query followed by the second word in the sequence of words in the modified query). Alternatively, the media guidance application may select words based on a category associated with each word. For example, the media guidance application may select a word corresponding to an action verb category first, followed by a word corresponding to a subject category second. However, the media guidance application may use any other selection method based on any other sequence of categories.

At step 1012, the media guidance application computes a first representation vector for the selected word. For example, the media guidance application may apply an algorithm that identifies an embedding of a word in a vector space based on a trained corpus of word data as described above. The media guidance application may store data identifying the vector, such as coordinates in the vector space corresponding to the word vector in memory (e.g., storage 708 or media guidance data source 818 via communications network 814).

At step 1014, the media guidance application retrieves a search query template from memory. For example, the media guidance application may select a search query template randomly or sequentially from memory (e.g., storage 708 or media guidance data source 818 via communications network 814). In another example, the media guidance application may select the template based on categories associated with words in the search query. For example, when the modified search query has words associated with an action verb category, the media guidance application may retrieve a template comprising an action verb.

At step 1016, the media guidance application identifies a word in the search query template matching a category of the selected word. For example, when the media guidance application receives a query "Stream Game of Thrones," the media guidance application may retrieve a template comprising a search query template "Play Media" (e.g., because the template comprises an action verb, play, and the input query comprises an action verb "stream"). The media guidance application may select the word "Stream" from the search query and may accordingly select "Play" from the search query template because the words "Play" and "Stream" both correspond to an action verb category.

At step 1018, the media guidance application computes a second representation vector for the word identified in the search query. For example, the media guidance application may compute a representation vector for the word "Play" using any of the methods described above, or may alternatively or additionally retrieve a pre-computed representation vector from a database associated with the template (e.g., storage 708 or media guidance data source 818 via communications network 814).

At step 1020, the media guidance application computes a distance between the first representation vector and the second representation vector. For example, the media guidance application may compute a distance between the two vectors using any vector distance computation such as a cosine difference between the two vectors.

At step 1022, the media guidance application determines whether the distance is greater than a threshold maximum distance. For example, the media guidance application may compute a distance between "Play" and "Stream" and may determine that a vector corresponding to the word "Stream" is close to a vector corresponding to the word "Play" because the words have similar meaning and/or frequently co-appear with similar words based on a text corpus. The media guidance application may retrieve a threshold for a maximum distance before a value is added to a score associated with the template. For example, the media guidance application may compute the score to quantify a distance between the template and the search query as a whole (e.g., based on the distances of a plurality of words in the modified search query to a plurality of words in the template). When the media guidance application determines that the words are close (e.g., within the threshold) the media guidance application may not penalize the distance by adding any value to the score. If the media guidance application determines that the distance is greater than a threshold maximum distance, the media guidance application increments the score corresponding to the template at step 1024. Otherwise, the media guidance application proceeds to step 1026.

At step 1024, the media guidance application increments a score corresponding to the search query template based on a degree to which the first representation vector differs from the second representation vector. For example, the media guidance application may increment the score based on the distance between the first representation vector and the second representation vector. In some embodiments, the media guidance application may scale the score. For example, the media guidance application may multiply the distance between the two vectors by two (or any other number) and may increment the score by result of the multiplication.

At step 1026, the media guidance application determines if a last word of the modified input query is selected. The media guidance application may determine when it has selected each word from the modified input query for comparison to a corresponding word in the template. For example, the media guidance application may incrementally select each word of the input query. The media guidance application may store (e.g., in storage 708 or in media guidance data source 818 via communications network 814) a number of words in the input query and an index value indicating a position of the word selected by the media guidance application. The media guidance application may determine that the last word is selected when the index value matches the number of words in the input query. The media guidance application may use any other method to recognize when each word of the input query has been selected. When the media guidance application determines that the last word of the modified input query is selected, the media guidance application proceeds to step 1028. Otherwise, the media guidance application proceeds to step 1010 to select another word from the input query.

At step 1028, the media guidance application determines whether the score corresponding to the search query template is greater than a threshold maximum score (e.g., to determine whether the search template should be used for the search). For example, the media guidance application may retrieve a threshold from memory indicating a maximum score allowable for the search query template to be used for the search. In some embodiments, the media guidance application may compute the threshold. For example, the media guidance application may compute the threshold based on a score of other search query templates. For example, the media guidance application may rank each respective search query template with respect to a respective score for the search query template. The media guidance application may compute the threshold maximum score as the score of the second highest ranked search query template (e.g., so that only the highest ranked search query template is selected). When the media guidance application determines that the score is greater than the threshold maximum score, the media guidance application proceeds to step 1014 to retrieve a search query template from memory (e.g., the highest ranked search query template or another search query template). Otherwise, the media guidance application proceeds to step 1030 to generate a query based on the template.

At step 1030, the media guidance application generates a query based on the template, wherein the identified word in the search query is replaced with a word from the modified input query. For example, the media guidance application may retrieve an input query "How can I play Hunger Games?" The media guidance application may match the input query to a search query template associated with the words "Media playback options". The media guidance application may generate the search query based on the template by replacing the word "Media" with the word "Hunger Games" from the input query. For example, the media guidance application may replace a word in the template with a word in the query based on a determination that the word in the query is associated with a same category as a word in the template. For example, the media guidance application may determine that "Hunger Games" is the subject of the input query and that "Media" is a subject of the template. The media guidance application may generate the query "Hunger Games playback options" by replacing the word "Media" with "Hunger Games" in the query. In another example, the media guidance application may receive a query such as, "Stream Lord of the Rings". The media guidance application may match the query to a template comprising the word "Get Media How" (e.g., because this template may be generalizable for all methods to get the media). The media guidance application may match the word "Stream" to the words "Get" and "How" in the query, because the word "stream" both describes an action that the user wants to perform (e.g., get the media) and how the user wants the action to be performed (e.g., streamed vs. received on a Blu-ray disk via the mail). The media guidance application may replace the word "how" in the template with the word "stream" (e.g., because it describes how the user wants to get the media) and may replace the word "media" in the template with the word "Lord of the Rings" (e.g., the media the user is looking for).

At step 1032, the media guidance application retrieves search results using the generated query. For example, the media guidance application may identify a database associated with the template (e.g., a database comprising search results for search queries based on the template). For example, when the search query template is associated with media playback, the media guidance application may identify a database associated with media. When the search query template is associated with fantasy sports statistics, the media guidance application may identify a database associated with fantasy sports players. The media guidance application may transmit the generated query to the database to retrieve search results from the database. The media guidance application may generate for display or may synthesize via a text-to-speech algorithm any search results retrieved by the media guidance application using any of the methods described above.

It should be noted that any of processes 900 and/or 1000 or any step thereof could be performed on, or provided by, any of the devices shown in FIGS. 1, 4, 7-8. For example, process 900 and/or 1000 may be executed by control circuitry 704 (FIG. 7) as instructed by control circuitry implemented on user equipment on user equipment 802, 804, and/or 806 (FIG. 8), 100 (FIG. 1), and/or 400 (FIG. 4) in order to recognize a plurality of natural language queries as having a similar intent and provides search results matching the intent.

It is contemplated that the steps or descriptions of FIG. 9 and/or FIG. 10 may be used with any other embodiment of this disclosure. In addition, the steps and descriptions described in relation to FIG. 9 and/or FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1, 4, and 7-8 could be used to perform one or more of the steps in FIG. 9 and/or FIG. 10.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, matching an input user query to a template may be performed by processing circuitry, e.g., by processing circuitry 706 of FIG. 7. The processing circuitry, for instance, may be a general purpose processor, a customized integrated circuit (e.g., an ASIC), or a field-programmable gate array (FPGA) within user equipment 700, media content source 816, or media guidance data source 818. For example, a profile, as described herein, may be stored in, and retrieved from, storage 708 of FIG. 7, or media guidance data source 818 of FIG. 8. Furthermore, processing circuitry, or a computer program, may update settings associated with a user corpus, stored within storage 708 of FIG. 7 or media guidance data source 818 of FIG. 8.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for performing a search, the method comprising:
   receiving, via an input device, an input comprising a first word and a second word;
   determining a first ratio of inputs that contain the first word and the second word out of a set of inputs received from at least one user device;
   selecting a candidate template containing the second word and a third word wherein the first word, the second word, and the third word are different from each other;
   determining a second ratio of inputs that contain the second word and the third word out of the set of inputs;
   based on comparing the first ratio and the second ratio:
      determining that the candidate template is to be used to retrieve search results in response to the input; and
   generating for display the search results retrieved based on the candidate template.

2. The method of claim 1, wherein the set of inputs has been received from a plurality of user devices.

3. The method of claim 1, wherein the set of inputs has been received from a single user device.

4. The method of claim 1, wherein the comparing the first ratio and the second ratio comprises calculating a difference between the first ratio and the second ratio, and wherein the determining that the candidate template is to be used to retrieve search results comprises:
   determining whether the difference between the first ratio and the second ratio is less than a threshold difference; and
   in response to determining that the difference between the first ratio and the second ratio is less than the threshold difference, determining that the candidate template is to be used to retrieve search results.

5. The method of claim 4, wherein the difference is a first difference, further comprising:
   in response to determining that the first difference is not less than the threshold difference:
      selecting a fourth word in the input;
      determining a third ratio of inputs that contain the fourth word and the second word out of the set of inputs;
      calculating a second difference between the third ratio and the second ratio;
      in response to determining that the second difference is less than the threshold difference, determining that the candidate template is to be used to retrieve search results.

6. The method of claim 4, wherein the candidate template is a first candidate template, and wherein the difference is a first difference, further comprising:
   in response to determining that the first difference is not less than the threshold difference:
      retrieving a second candidate template, wherein the second candidate template contains the second word and a fourth word;

determining a third ratio of inputs that contain the second word and the fourth word out of the set of input queries;
calculating a second difference between the third ratio and the second ratio;
in response to determining that the second difference value is less than a threshold difference value, determining that the second candidate template is to be used to retrieve search results.

7. The method of claim 1, further comprising:
subsequent to receiving the input, identifying the second word by:
identifying a part of speech associated with a candidate second word in the input; and
in response to determining that the candidate second word is a subject of the input, identifying the candidate second word as the second word.

8. The method of claim 1, further comprising:
subsequent to receiving the input, identifying the first word by:
comparing a candidate first word to a list of words that do not add meanings to search queries;
in response to determining the candidate first word does not match any words on the list of words that do not add meanings to search queries, identifying the candidate first word as the first word.

9. The method of claim 1, wherein the candidate template is selected from a database containing a plurality of templates.

10. The method of claim 1, wherein generating for display the retrieved search results further comprises:
retrieving a layout from the database associated with the candidate template; and
generating for display the retrieved search results based on the layout.

11. A system for performing a search, the system comprising:
control circuitry configured to:
receive, via an input device, an input comprising a first word and a second word wherein the first word, and the second word are different from each other;
determine a first ratio of inputs that contain the first word and the second word out of a set of inputs received from at least one user device;
select a candidate template containing the second word and a third word;
determine a second ratio of inputs that contain the second word and the third word out of the set of inputs wherein the second word, and the third word are different from each other;
based on comparing the first ratio and the second ratio:
determine that the candidate template is to be used to retrieve search results in response to the input; and
generate for display the search results retrieved based on the candidate template.

12. The system of claim 11, wherein the control circuitry is configured to receive the set of inputs from a plurality of user devices.

13. The system of claim 11, wherein the control circuitry is configured to receive the set of inputs from a single user device.

14. The system of claim 11, wherein the control circuitry is configured to compare the first ratio and the second ratio by calculating a difference between the first ratio and the second ratio, and wherein the control circuitry is configured to determine that the candidate template is to be used to retrieve search results by:

determining whether the difference between the first ratio and the second ratio is less than a threshold difference; and
in response to determining that the difference between the first ratio and the second ratio is less than the threshold difference, determining that the candidate template is to be used to retrieve search results.

15. The system of claim 14, wherein the difference is a first difference, and wherein the control circuitry is further configured to:
in response to determining that the first difference is not less than the threshold difference:
select a fourth word in the input;
determine a third ratio of inputs that contain the fourth word and the second word out of the set of inputs;
calculate a second difference between the third ratio and the second ratio;
in response to determining that the second difference is less than the threshold difference, determine that the candidate template is to be used to retrieve search results.

16. The system of claim 14, wherein the candidate template is a first candidate template, wherein the difference is a first difference, and wherein the control circuitry is further configured to:
in response to determining that the first difference is not less than the threshold difference:
retrieve a second candidate template, wherein the second candidate template contains the second word and a fourth word;
determine a third ratio of inputs that contain the second word and the fourth word out of the set of input queries;
calculate a second difference between the third ratio and the second ratio;
in response to determining that the second difference value is less than a threshold difference value, determine that the second candidate template is to be used to retrieve search results.

17. The system of claim 11, wherein the control circuitry is further configured to:
subsequent to receiving the input, identify the second word by:
identifying a part of speech associated with a candidate second word in the input; and
in response to determining that the candidate second word is a subject of the input, identifying the candidate second word as the second word.

18. The system of claim 11, wherein the control circuitry is further configured to:
subsequent to receiving the input, identify the first word by:
comparing a candidate first word to a list of words that do not add meanings to search queries;
in response to determining the candidate first word does not match any words on the list of words that do not add meanings to search queries, identifying the candidate first word as the first word.

19. The system of claim 11, wherein the control circuitry is configured to select the candidate template from a database containing a plurality of templates.

20. The system of claim 11, wherein the control circuitry, when generating for display the retrieved search results, is further configured to:
retrieve a layout from the database associated with the candidate template; and generate for display the retrieved search results based on the layout.

* * * * *